United States Patent
Ten

(10) Patent No.: US 8,179,402 B2
(45) Date of Patent: May 15, 2012

(54) GENERATING COLORIMETRIC PROFILES FROM SPECTRAL DATA AND USER INPUT

(75) Inventor: Arkady Ten, Sunnyvale, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1006 days.

(21) Appl. No.: 11/979,074

(22) Filed: Oct. 31, 2007

(65) Prior Publication Data

US 2009/0109237 A1    Apr. 30, 2009

(51) Int. Cl.
    G09G 5/22    (2006.01)
(52) U.S. Cl. ........ 345/600; 345/428; 345/549; 345/581; 345/619; 382/167; 382/254; 382/274; 382/300
(58) Field of Classification Search ................. 345/589, 345/600, 603, 581, 428, 619, 549; 382/167, 382/523, 254, 274, 300; 703/21
    See application file for complete search history.

(56) References Cited

U.S. PATENT DOCUMENTS

| | | | | |
|---|---|---|---|---|
| 5,363,318 | A * | 11/1994 | McCauley | 702/85 |
| 5,539,522 | A * | 7/1996 | Yoshida | 358/296 |
| 5,680,333 | A * | 10/1997 | Jansson | 703/6 |
| 6,021,277 | A * | 2/2000 | Sowinski et al. | 396/6 |
| 6,043,909 | A * | 3/2000 | Holub | 358/504 |
| 6,157,735 | A * | 12/2000 | Holub | 382/167 |
| 6,310,626 | B1 * | 10/2001 | Walker et al. | 345/589 |
| 6,459,425 | B1 * | 10/2002 | Holub et al. | 345/207 |
| 6,750,992 | B1 * | 6/2004 | Holub | 358/504 |
| 6,995,870 | B2 * | 2/2006 | Holub | 358/1.9 |
| 7,075,643 | B2 * | 7/2006 | Holub | 356/326 |
| 7,312,897 | B2 * | 12/2007 | Holub | 358/1.9 |
| 7,710,560 | B2 * | 5/2010 | Holub | 356/300 |
| 7,715,052 | B2 * | 5/2010 | Holub | 358/2.1 |
| 7,728,845 | B2 * | 6/2010 | Holub | 345/589 |
| 7,729,008 | B2 * | 6/2010 | Holub | 358/1.9 |
| 7,791,761 | B2 * | 9/2010 | Holub | 358/1.9 |
| 7,830,546 | B2 * | 11/2010 | Holub | 358/1.9 |
| 2001/0047250 | A1 * | 11/2001 | Schuller et al. | 703/1 |
| 2002/0044756 | A1 * | 4/2002 | Ishii | 386/1 |

(Continued)

OTHER PUBLICATIONS

Microsoft Corporation, Windows Color System, 2007, (accessed Jun. 4, 2007), base link at http://msdn2.microsoft.com/en-us/library/ms536514.aspx, (including links thereunder), 187 printed pages.

(Continued)

*Primary Examiner* — Xiao M. Wu
*Assistant Examiner* — Abderrahim Merouan
(74) *Attorney, Agent, or Firm* — Fitzpatrick, Cella, Harper & Scinto

(57) ABSTRACT

A profile generation module which generates colorimetric color profiles based on spectral data and user input on viewing conditions, light source, and medium. In situations where the available color profiles are colorimetric, the colorimetric color profiles are passed to the color management system. In situations where spectral color profiles are available, the profile generation module accesses the spectral profile and the user input. If the user input specifies a medium, the profile generation module also accesses the media module to predict spectral reflectance data for the specified medium. The profile generation module generates the calorimetric color appearance profile based on the user input, and generates the calorimetric color device profile based on the user input and the spectral data. In this way, calorimetric color profiles are generated as needed, and spectral data can be used with calorimetrically based color management systems.

52 Claims, 5 Drawing Sheets

U.S. PATENT DOCUMENTS

| | | | |
|---|---|---|---|
| 2002/0145744 A1* | 10/2002 | Kumada et al. | 358/1.9 |
| 2002/0154325 A1* | 10/2002 | Holub | 358/1.9 |
| 2003/0020703 A1* | 1/2003 | Holub | 345/207 |
| 2003/0065491 A1* | 4/2003 | Roberts | 703/2 |
| 2005/0078122 A1* | 4/2005 | Ohga | 345/589 |
| 2005/0094871 A1* | 5/2005 | Berns et al. | 382/162 |
| 2005/0249403 A1* | 11/2005 | Haikin | 382/162 |
| 2006/0082798 A1* | 4/2006 | Holub | 358/1.9 |
| 2006/0086477 A1* | 4/2006 | Holub | 164/130 |
| 2006/0197757 A1* | 9/2006 | Holub | 345/207 |
| 2006/0232805 A1* | 10/2006 | Holub | 358/1.9 |
| 2006/0232806 A1* | 10/2006 | Holub | 358/1.9 |
| 2006/0243415 A1* | 11/2006 | Holub | 164/130 |
| 2007/0076260 A1* | 4/2007 | Upton | 358/3.21 |
| 2007/0153340 A1* | 7/2007 | Itagaki et al. | 358/504 |
| 2007/0291312 A1* | 12/2007 | Kaneko et al. | 358/2.1 |
| 2008/0123948 A1* | 5/2008 | De Baer | 382/167 |
| 2008/0144114 A1* | 6/2008 | Woolfe et al. | 358/3.24 |

OTHER PUBLICATIONS

International Color Consortium®, Image technology colour management—Architecture, profile format, and data structure, Specification ICC.1:2004-10, 2004.

Koren, Norman, "Color management and color science: Introduction," 2002, (accessed Jul. 27, 2007), http://www.normankoren.com/color_management.html.

Stone, M. David, "Color Matching: Color (Mis)Matching, and Why Colors are Matching Better Than Ever," Jun. 11, 2001, (accessed Jul. 27, 2007), http://www.extremetech.com/article2/0,1697,290797,00.asp.

Rollins, Mike, "A Short Course in Color Management," 2002, (accessed Jul. 27, 2007), http://www.mikerollins.com/Tutorials/ColorMgt.htm.

Rollins, Mike, "Device Profiles," 2002, (accessed Jul. 27, 2007), http://www.mikerollins.com/Tutorials/DeviceProfiles.htm.

U.S. Appl. No. 11/643,908, filed Dec. 22, 2006, Haikin.

* cited by examiner

GENERATING COLORIMETRIC PROFILES FROM SPECTRAL DATA AND USER INPUT

BACKGROUND OF THE INVENTION

1. Field of the Invention

The present invention concerns color management systems, and specifically concerns construction of colorimetric color appearance profiles and colorimetric color device profiles from spectral data. In particular, based on a spectral profile and on user input on viewing conditions, light source and media, a calorimetric color appearance profile and a colorimetric color device profile are constructed, so as to assure interoperability with color management systems which require both a colorimetric color appearance profile and a calorimetric color device profile for color management, such as the Windows Vista color management system and other similar color management systems.

2. Description of the Related Art

Currently, color management systems typically use colorimetric data values in order to convert from one color space to another. Usually, the colorimetric data is in CIEXYZ format. Color device profiles store values of the device's color characteristics. These values include a white point, colorimetric measurements and corresponding device values. The color device profile allows a device module to create accurate color mapping between colorimetric values under a specified light source and the device's values. In addition to the color device profile, a separate color appearance profile is provided which contains measurements of the viewing conditions under which a document is to be viewed. These measurements include a white point, and surrounding viewing information such as luminance level and the observer's level of adaptation. The color appearance profile allows a color appearance module to predict appearance of the output based on both the device's color characteristics and the viewing conditions.

Referring specifically to the Windows® Vista® color management system (WCS) as an example of a calorimetrically based color management system, WCS is designed to improve consistency and accuracy in color reproduction across different imaging devices. WCS is designed to work with calorimetric data for color management. WCS requires both a calorimetric color appearance profile and a calorimetric color device profile. Typically, a software takes the colorimetric color appearance profile and the calorimetric color device profile for a source device together with the corresponding colorimetric color appearance and device profiles for a destination device, and then using these four profiles processes the image data through WCS to convert color image data from the source device values (i.e. source color space) to the destination device values (i.e. destination color space).

WCS refers to these profiles as "color appearance model profile" (CAMP) and "color device model profile" (CDMP).

Currently, WCS standard output profiles are designed for certain viewing conditions, light source and media. Viewing conditions and light source affect both the colorimetry and the perception of colors dramatically. Also, different media significantly affect ink reflectance spectra. Every combination of viewing condition, light source and output medium is addressed by an appropriate pair of output profiles, namely a colorimetric CAMP and a colorimetric CDMP. For example, if the CAMP is for a D50 light source and an illumination level of 500 lux, then the CDMP should contain calorimetric values measured under a D50 illuminant. Building new profiles is complex, inconvenient and error prone. Correctness of profile pairing is not checked by WCS and mismatches of the profiles are possible.

The ability to adapt to new viewing conditions and media in WCS is limited. Currently, a change in viewing conditions or media has a system wide effect and requires changes in the system properties. For example, if a user chooses a certain CAMP for a printer, this CAMP will affect all printing devices installed in the system. This is sometimes undesirable.

The inventor has become aware of recent advances in color management systems which use spectral data rather than colorimetric data. A spectral device profile contains device values and corresponding spectral measurements. The advantage of spectral data is that the colorimetric values can be calculated for any light source, thereby providing a more flexible tool for color management and promising unparalleled accuracy in color reproduction and fidelity. The inventor has noticed, however, that spectral profiles are incompatible and cannot currently be used with WCS, or other similar color management systems.

SUMMARY OF THE INVENTION

The invention herein addresses these shortcomings, through dynamic construction of colorimetric color appearance profiles and colorimetric color device profiles from spectral profiles together with user input on viewing conditions, light source and output medium.

Accordingly, the invention concerns generation of colorimetric color appearance profiles and colorimetric color device profiles based on spectral data and user input for use by a colorimetrically based color management system, such as WCS or other similar color systems. User input may include input on viewing conditions, light source, and output medium. If the user input includes a medium, a media module is accessed which predicts the spectral reflectance of color patches on the medium. A profile generation module takes the user input and the information stored in a spectral profile or generated by the media module and generates a compatible colorimetric color appearance profile and a compatible colorimetric color device profile. The colorimetrically based color management system can then use the generated colorimetric color appearance profile and the generated colorimetric color device profile to convert the source image to output device values that maintain appearance or colorimetric match of the source image. The spectral profile may optionally contain colorimetric data in addition to spectral data that can be used if the user input corresponds to predesignated standard medium and/or light source.

By virtue of the foregoing arrangement, it is ordinarily possible to provide a colorimetrically based color management system with the needed colorimetric profiles, so as to allow the colorimetrically based color management system to operate in situations where spectrally-based profiles are available but where colorimetric profiles might not be available. Advantageously, the generated colorimetric profiles are provided to the color management system transparently, in the sense that there is ordinarily no need for the color management system to know that the source of the colorimetric profile for the destination (i.e. output) device is spectrally-based, such that there also is ordinarily no need to change the architecture of the color management system. Also, the colorimetric color appearance profiles and the colorimetric color device profiles are generated as needed, based on user input. This enables easier adaptation to changes in viewing conditions and media, improving integrity of the color appearance profile and color device profile pairs and reducing the possibility of user error. Overall, this extends the reliability, capability and convenience of colorimetrically based color management systems, such as WCS or other similar color systems.

According to a further aspect of the invention, colorimetric values are constructed based on the user input and spectral data and provided to the colorimetric profiles. Further, generation of the colorimetric profiles may be performed by a profile generation module in a device driver or an application. According to another aspect of the invention, the user input may be entered through a user interface, allowing corresponding profiles to be generated on-the-fly. If the user input specifies viewing conditions that are different from predesignated standard viewing conditions, but not the light source, then the colorimetric color appearance profile may be generated; if the user input specifies a medium and/or light source different from predesignated standard medium and/or light source then the colorimetric color device profile may be generated; if the user input includes the viewing condition and the medium and/or light source, i.e. if no predesignated standard color appearance profile and no predesignated standard color device profile are available, then both the colorimetric color appearance profile and the colorimetric color device profile may be generated; and if the user input includes a predesignated standard viewing condition, light source, and medium then a predesignated standard color appearance profile and a predesignated standard color device profile may be used without need to generate custom profiles.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
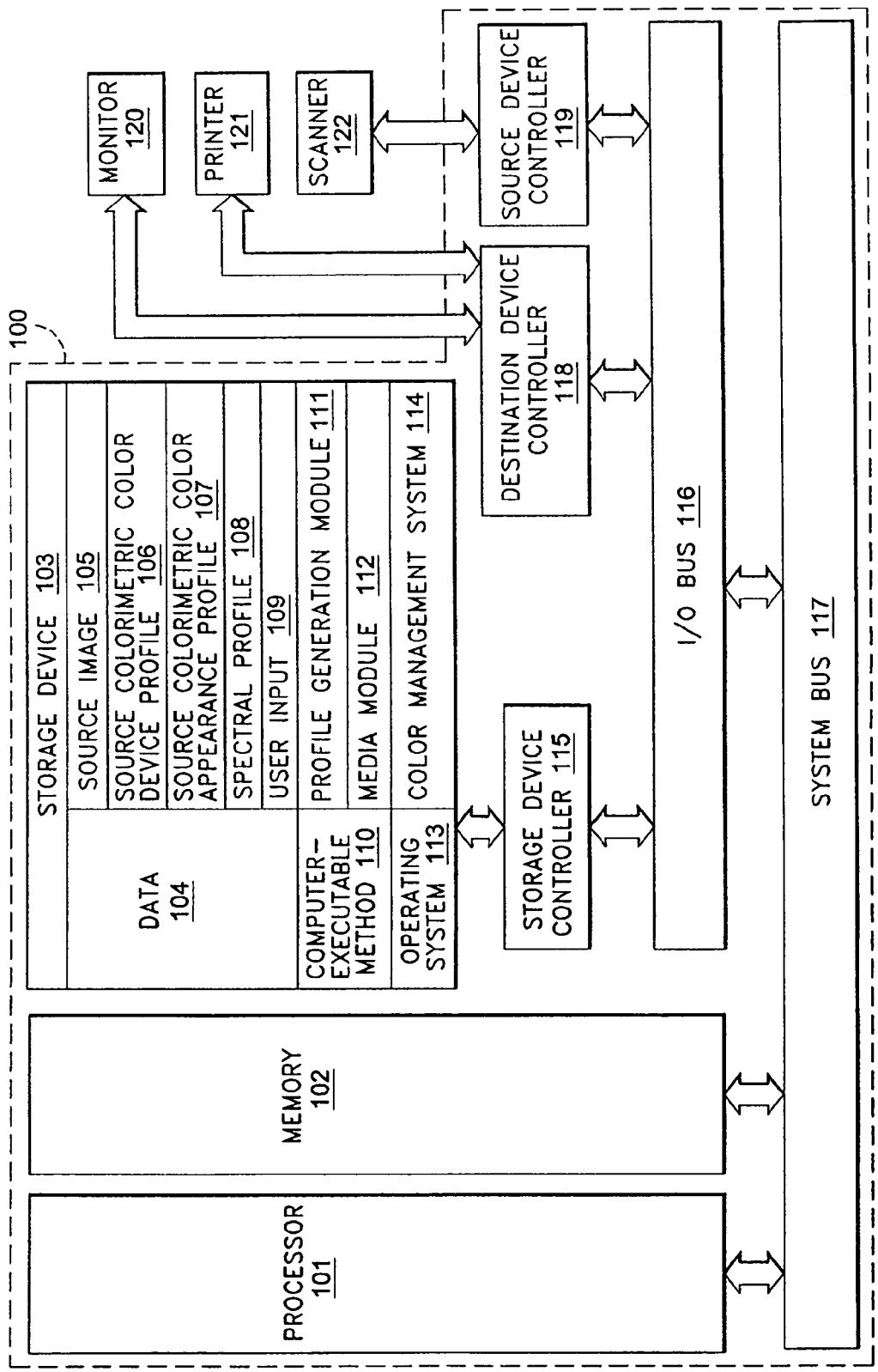
FIG. 1 is an architecture diagram for a data processing apparatus, such as a general purpose computing machine, in which the present invention may be implemented.

FIG. 1 is an architecture diagram for a data processing apparatus, such as a general purpose computing machine, in which the present invention may be implemented. Data processing system 100 includes processor 101 coupled to memory 102 via system bus 116. Processor 102 is also coupled to external input/output (I/O) devices via system bus 117 and I/O bus 116. A storage device 103 having computer system readable media is coupled to processor 101 via storage device controller 115, I/O bus 116 and system bus 117. Storage device 103 is used by processor 101 to store and read data 104, such as source image 105, source colorimetric color device profile 106, source colorimetric color appearance profile 107, spectral profile 108, and user input 109; computer-executable method 110, such as software and application programs which implement profile generation module (PGM) 111 and media module 112; and operating system 113 implementing color management system (CMS) 114. Processor 101 may further be coupled to destination devices, such as computer monitor 120 and printer 121, via destination device controller 118 coupled to I/O bus 116. Processor 101 may also be coupled to source devices, such as a scanner 122, via source device controller 119. The destination devices may have associated destination color device profiles and the source devices may have associated source color device profiles.

In operation, processor 101 loads computer-executable method 110 from storage device 103 into memory 102. Processor 101 then executes loaded computer-executable method 110, such as PGM 111 and media module 112, to generate colorimetric profiles. In order to generate colorimetric profiles, PGM 111 accesses spectral profile 108, user input 109 and, if user input 109 specifies a medium, media module 112. The resulting colorimetric profiles may be used by a CMS 114 to perform a color processing task, such as converting colors from source image 105 to corresponding colors in destination image in order to maintain color appearance. This process is discussed in further detail, below, in reference to FIG. 2.

A color management module according to the present invention may be incorporated in a destination device driver, such as a printer driver, embedded in the firmware of an output device, such as a printer, or provided in a stand-alone application. It can be appreciated that the present invention is not limited to these embodiments and that the present invention may be used in other environments in which color management is used.

Figure 2:
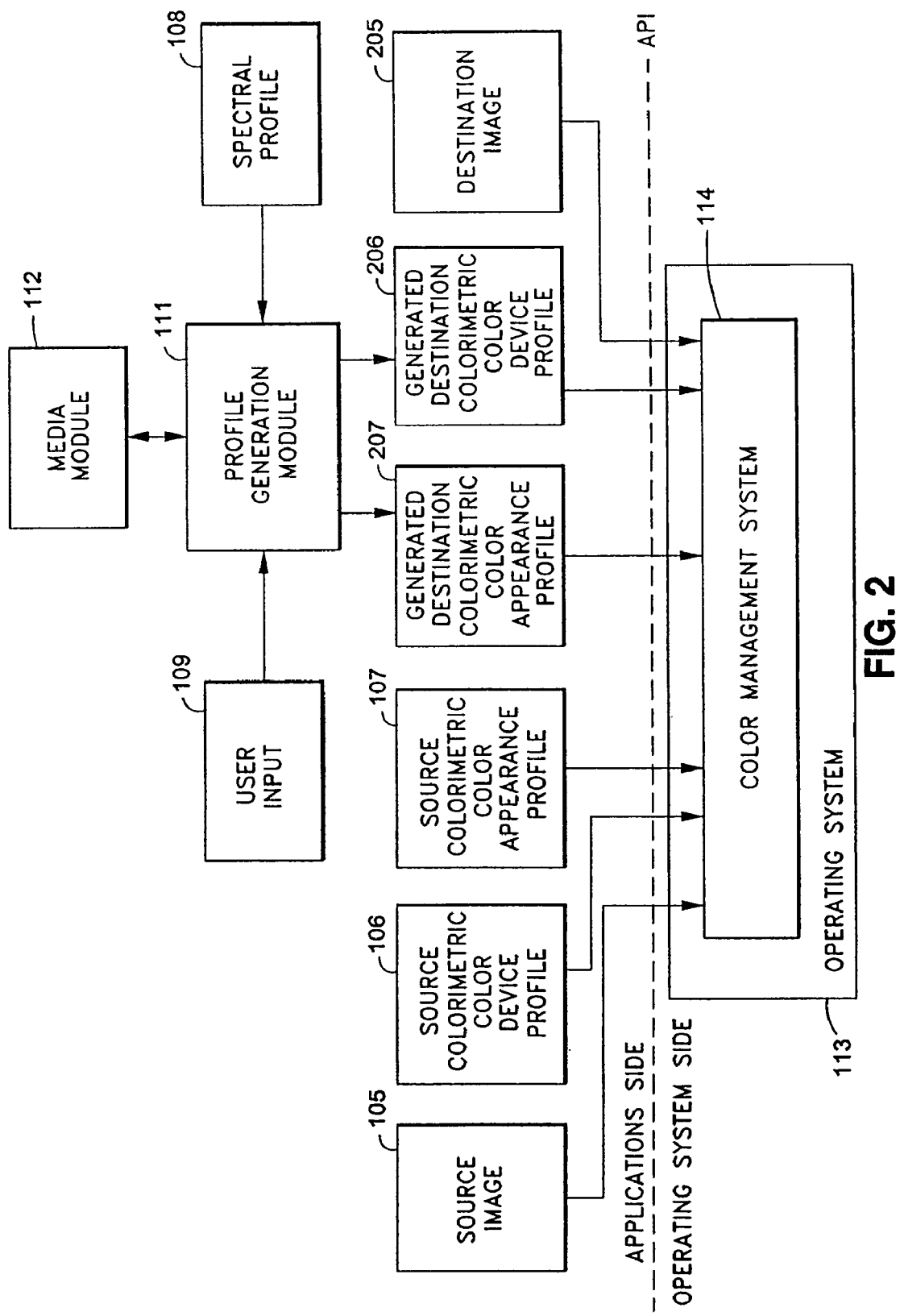
FIG. 2 is a representational view of color processing performed by a color management system according to one embodiment of the present invention.

FIG. 2 is an architectural diagram of a color management scheme according to one embodiment of the present invention in connection with a colorimetrically based CMS 114, such as WCS or other similar color management systems. In this embodiment, CMS 114 is implemented as part of operating system 113, such as Windows Vista or other similar operating systems. However, CMS 114 may also be implemented by an application or standalone module.

CMS 114 converts colors from source image 105 to corresponding colors in destination image 205 in order to maintain the color reproduction requirements, for example, but not limited to, color appearance, color match, and measurement matching, for source image 105. CMS 114 uses generated destination colorimetric color appearance profile 207 and generated destination colorimetric color device profile 206 together with source colorimetric color appearance profile 107 and source colorimetric color device profile 106 to convert source image 105 to the appropriate destination image 205.

Source profiles characterize the conditions under which a source image 105 is created. Source colorimetric color device profile 106 contains information about the source device, such as a scanner or digital camera. This information includes colorimetric values of a white point and corresponding device values. Source colorimetric color appearance profile 107 contains information about the viewing conditions associated with source image 105. This information includes colorimetric values of a white point, surrounding viewing information, luminance level, and the observer's level of adaptation.

Destination profiles are generated by PGM 111. Generated destination colorimetric color device profile 206 contains information about the destination device, such as a printer or monitor. This information includes colorimetric values of a white point and corresponding device values. Generated destination colorimetric color appearance profile 207 contains information about the viewing conditions associated with destination image 205. This information includes colorimetric values of a white point, surrounding viewing information, luminance level, and the observer's level of adaptation. PGM 111 accesses spectral profile 108, user input 109, and media module 112 in order to generate destination colorimetric color appearance profile 207 and destination colorimetric color device profile 206.

According to the present embodiment, spectral profile 108 contains measurements of a destination device's color characteristics, including device values and corresponding spectral reflectances for a particular medium on which the spectral reflectance data was measured. In another embodiment, the spectral profile 108 may optionally contain colorimetric values in addition to spectral data in order to facilitate population of the colorimetric profiles. This embodiment is described in more detail in reference to FIG. 4, below.

User input 109 may include information on a viewing condition, light source and medium. User input 109 may further include a light source spectral power distribution, an illumination level, an intensity of the light source, a surround characteristic, and an observer adaptation level. In another embodiment of the present invention, user input 109 may be entered through a user interface, such as a dialog, thus enabling PGM 111 to generate profiles corresponding to user input 109 on-the-fly. In a further embodiment of the invention, the user interface includes a measuring device which allows the user to directly measure and store the information to be input (i.e. user input 109). In yet another embodiment of the present invention, user input 109 may be selected from a list of predesignated standard inputs, such as light source and output medium.

PGM 111 accesses media module 112 if user input 109 specifies an output medium. Media module 112 predicts the spectral reflectance of color patches on the specified medium based on the spectral reflectance of color patches on another medium or media, taking into account the interaction between medium and ink.

Alternatively, the spectral reflectance of color patches on several mediums or media may be used to predict the spectral reflectance of color patches on the specified medium. Parameters for media module 112 may be derived from spectral profile 108 or be stored in spectral profile 108. According to another embodiment of the invention, PGM 111 first searches through a list of available spectral color device profiles to find a match for the specified medium if user input 109 specifies an output medium. This embodiment is described in more detail in reference to FIG. 5, below.

In the present embodiment, PGM 111 generates destination colorimetric color appearance profile 207 based on user input 109. PGM 111 generates destination colorimetric color device profile 206 based on user input 109 and spectral data in spectral profile 108. If user input 109 specifies a medium, PGM 111 also uses spectral reflectance data obtained from media module 112 in addition to user input 109 and spectral profile 108 to generate destination colorimetric color device profile 206.

Specifically, PGM 111 generates destination colorimetric color appearance profile 207 by constructing colorimetric values from user input 109 and providing the colorimetric values to destination colorimetric color appearance profile 207. PGM 111 generates destination colorimetric color device profile 206 by constructing colorimetric values from user input 109 and the spectral data in spectral profile 108 and providing the colorimetric values to destination colorimetric color device profile 206. If user input 109 specifies a medium, PGM 111 also uses the spectral reflectance data obtained from media module 112, in addition to user input 109 and spectral profile 108, to construct colorimetric values for destination colorimetric color device profile 206.

More specifically, PGM 111 constructs colorimetric values for destination colorimetric color appearance profile 207 by calculating colorimetric values that characterize the light source and the luminance of the light source from the spectral power distribution. The spectral power distribution may be input by the user as user input 108, stored in a file or application, or directly measured through a user interface. PGM 111 constructs colorimetric values for destination colorimetric color device profile 206 by convolving the spectral power distribution of the light source with the spectral reflectance data in spectral profile 108 or from media module 112, and a color matching function. PGM 111 also constructs the corresponding colorimetric value of the white point. The constructed colorimetric values are normalized and scaled before used to populate destination colorimetric color appearance profile 207 and destination colorimetric color device profile 206. The constructed colorimetric values, appropriate device values, and user input 109 are used to populate destination colorimetric color appearance profile 207 and destination colorimetric color device profile 206. CMS 114 can then use generated destination colorimetric color appearance profile 207 and generated destination colorimetric color device profile 206 together with source colorimetric color appearance profile 107 and source colorimetric color device profile 106 to convert source image 105 to the appropriate destination image 205.

Figure 3:
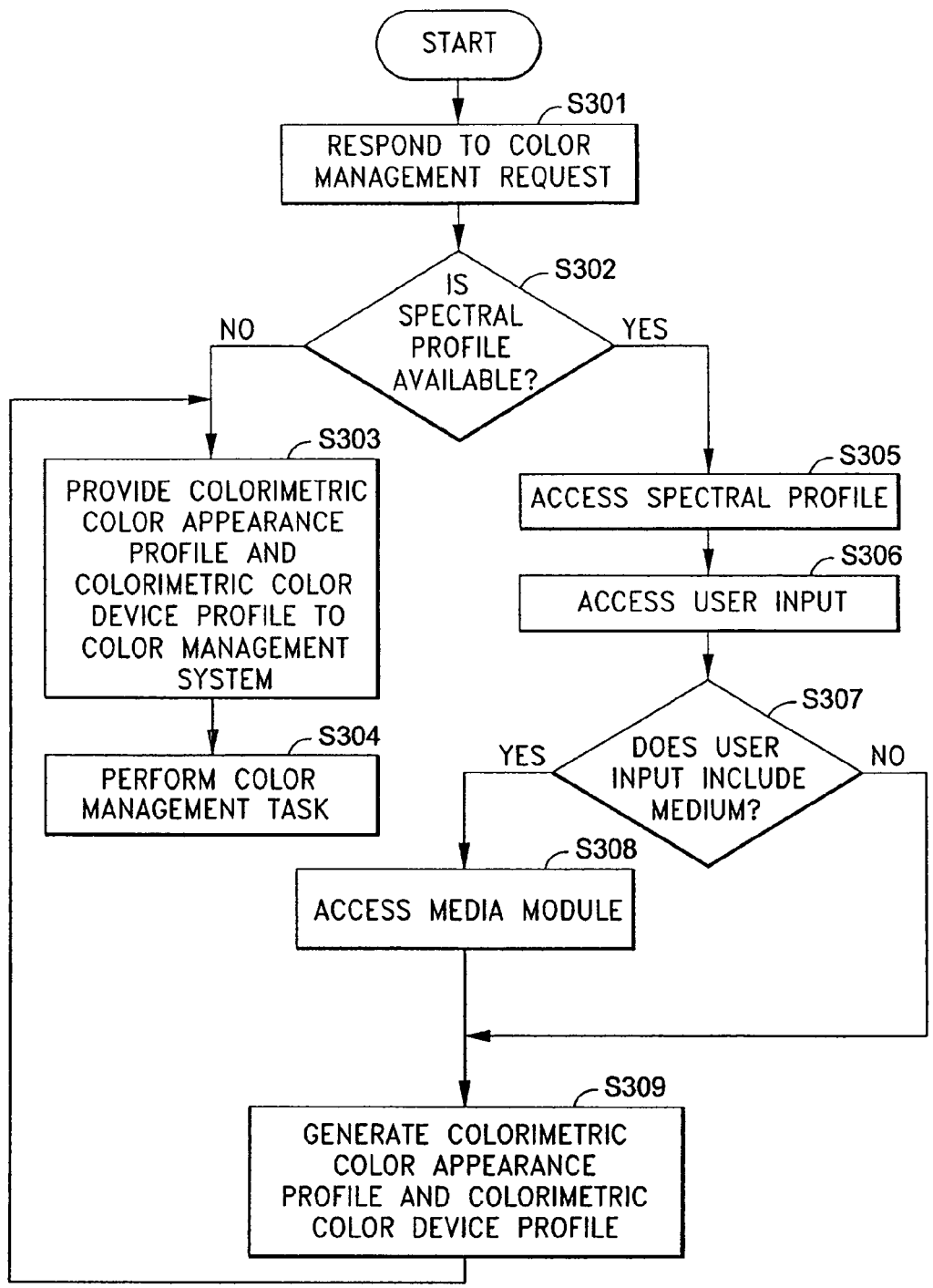
FIG. 3 is a flow diagram for explaining construction of colorimetric color profiles based on user input and spectral data according to an embodiment of the invention.

FIG. 3 is a flow diagram showing operation of PGM 111 and CMS 114 according to an embodiment of the present invention. In step S301, PGM 111 responds to a color management request from a device driver or an application software. In step S302, PGM 111 determines whether spectral profile 108 is available. If no spectral profile 108 is available, i.e. if only colorimetric profiles are available, the flow branches to step S303 where PGM 111 provides destination colorimetric color appearance profile 207 and destination colorimetric color device profile 206 to CMS 114. In step S304 CMS 114 uses source colorimetric color device profile 106, source colorimetric appearance profile 107, destination colorimetric color device profile 206, and destination colorimetric color appearance profile 207 to perform a color management task, such as converting source image 105 to the appropriate destination image 205.

On the other hand, if spectral profile 108 is available, the flow branches to step S305 where PGM 111 accesses spectral profile 108. In step S306, PGM 111 accesses user input 109. As step S307, PGM 111 determines whether user input 109 specifies a medium. If user input 109 includes a change in the medium, then the flow branches to step S308 in which PGM 111 accesses media module 112 in order to obtain spectral reflectance data for the specified medium. In step S309, PGM 111 generates destination colorimetric color appearance profile 207 based on user input 109 accessed in step S306, and generates destination colorimetric color device profile 206 based on user input 109 and the spectral reflectance data from media module 112 obtained in step S308, as previously described above in reference to FIG. 2. The flow then advances to step S303 where PGM 111 provides generated destination colorimetric color appearance profile 207 and generated destination colorimetric color device profile 206 to CMS 114. In step S303 CMS 114 performs a color management task using source colorimetric color device profile 106, source colorimetric appearance profile 107, generated destination colorimetric color device profile 206, and generated destination colorimetric color appearance profile 207, as previously described.

If user input 109 does not include a change in medium, the flow branches to step S309 in which PGM 111 generates destination colorimetric color appearance profile 207 based on user input 109, and destination colorimetric color device profile 206 based on user input 109 and spectral profile 108 accessed in step S305. The flow then advances to step S303 where PGM 111 provides generated destination colorimetric color appearance profile 207 and generated destination colorimetric color device profile 206 to CMS 114 and then to step S303 where CMS 114 performs a color management task using source colorimetric color device profile 106, source colorimetric appearance profile 107, generated destination colorimetric color device profile 206, and generated destination colorimetric color appearance profile 207, as previously described.

Figure 4:
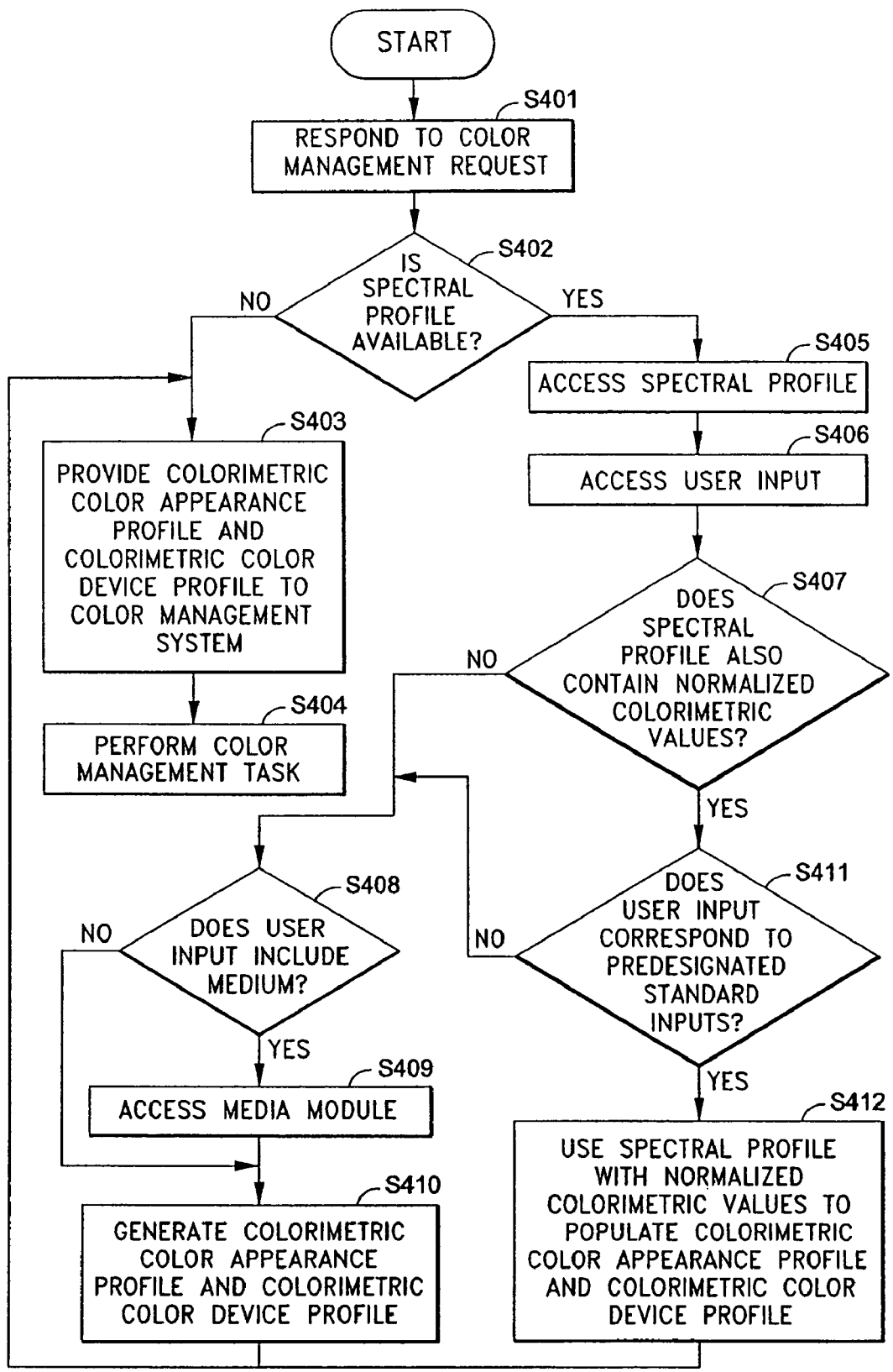
FIG. 4 is a flow diagram for explaining construction of colorimetric color profiles based on user input and spectral data also containing normalized colorimetric values according to another embodiment of the invention.

FIG. 4 is a flow diagram showing operation of PGM 111 and CMS 114 according to another embodiment of the present invention where spectral profile 108 may optionally contain normalized colorimetric values in addition to spectral data. Steps S401 to S406 correspond to steps S301 to S306 described above in FIG. 3, respectively. In step S407, PGM 111 determines whether spectral profile 108 also contains normalized colorimetric values in addition to spectral data. If spectral profile 108 does not contain normalized colorimetric values, the flow branches to step S408 where PGM 111 determines whether user input 109 specifies a medium. If user input 109 includes a medium, the flow branches to step S409 where PGM 111 accesses media module 112 to obtain the spectral reflectance data for the specified medium. In step S410, PGM 111 generates destination colorimetric color appearance profile 207 based on user input 109 and generates destination colorimetric color device profile 206 based on user input 109 and the spectral reflectance data from media module 112, as previously described. The flow advances to step S403 where generated destination colorimetric device profile 206 and generated destination colorimetric appearance profile 207 are provided to CMS 114 and then to step S404 where CMS 114 performs a color management task using source colorimetric color device profile 106, source colorimetric appearance profile 107, generated destination colorimetric color device profile 206, and generated destination colorimetric color appearance profile 207, as previously described.

If in step S408 PGM 111 determines that user input 109 does not include a medium, the flow branches to step S410 where PGM 111 generates destination colorimetric color appearance profile 207 based on user input 202 and destination colorimetric color device profile 206 based on user input 109 and spectral profile 108, as previously described. The flow advances to step S403 where generated destination colorimetric device profile 206 and generated destination colorimetric appearance profile 207 are provided to CMS 114 and then to step S404 where CMS 114 performs a color management task using source colorimetric color device profile 106, source colorimetric appearance profile 107, generated destination colorimetric color device profile 206, and generated destination colorimetric color appearance profile 207, as previously described.

If in step S407 PGM 111 determines that spectral profile 108 contains normalized colorimetric values, the flow branches to step S411 where PGM 111 determines whether user input 109 corresponds to predesignated standard inputs.

Predesignated standard inputs may be designated by CMS 114, a destination device driver, the firmware of an output device, an application, or a user. For example, CMS 114 may predesignate a frequently used light source and medium as standard inputs. If user input 109 corresponds to predesignated standard inputs, the flow branches to step S412. As step S412, PGM 111 uses spectral profile 108 containing normalized colorimetric values to populate destination colorimetric color appearance profile 207 or destination colorimetric color device profile 206 or both, corresponding to the predesignated standard inputs. For example, if user input 109 specifies a predesignated standard light source and/or medium but a non-standard viewing condition, spectral profile 108 containing normalized colorimetric values is used to populate destination colorimetric color device profile 206 while destination colorimetric color appearance profile 207 must be generated based on user input 109. However, if user input 109 specifies a non-standard light source and/or medium and a predesignated standard viewing condition, both destination colorimetric color appearance profile 207 and destination colorimetric color device profile 206 must be generated based on user input 109 and spectral profile 108. If each user input 109 corresponds to a predesignated standard input, spectral profile 108 containing normalized colorimetric values is used to populate both destination colorimetric color device profile 206 and destination colorimetric color appearance profile 207. In this way, spectral profile 108 may be used without modification. CMS 114 will ignore the spectral data and use the normalized colorimetric values because it only recognizes colorimetric data. This allows PGM 111 to populate destination colorimetric color appearance profile 207 and destination colorimetric color device profile 206 using the available data, instead of constructing the colorimetric values by the process previously described. The flow then advances to step S403 where destination colorimetric color appearance profile 207 and destination colorimetric color device profile 206 are provided to CMS 114 and then to step S404 where CMS 114 performs a color management task using source colorimetric color device profile 106, source colorimetric appearance profile 107, destination colorimetric color device profile 206, and destination colorimetric color appearance profile 207, as previously described.

Alternatively, if user input 109 corresponds to predesignated standard inputs, PGM 111 may have pre-computed, stored destination colorimetric color device and appearance profile pairs corresponding to predesignated standard inputs. In this case, the pre-computed profile pairs may be provided to CMS 114 without the need to generate new profiles or use spectral profile 108 to populate profiles.

If in step S411 PGM 111 determines that user input 109 does not correspond to predesignated standard inputs, the flow branches to step S408 where PGM 111 determines whether user input 109 includes a medium. If PGM 111 determines that user input 109 includes a medium, the flow branches to step S409 where PGM 111 accesses media module 112 to obtain the spectral reflectance data for the specified medium. In step S410, PGM 111 generates destination colorimetric color appearance profile 207 based on user input 109, and generates destination colorimetric color device profile 206 based on user input 109 and the spectral reflectance data from media module 112, as previously described. The flow then advances to step S403 where generated destination colorimetric color appearance profile 207 and generated destination colorimetric color device profile 206 are provided to CMS 114 and then to step S404 where CMS 114 performs a color management task using source colorimetric color device profile 106, source colorimetric appearance profile 107, generated destination colorimetric color device profile 206, and generated destination colorimetric color appearance profile 207, as previously described.

If PGM 111 determines that user input 109 does not include a medium, the flow branches to step S410 where PGM 111 generates destination colorimetric color appearance profile 207 based on user input 109 and destination colorimetric color device profile 206 based on user input 109 and spectral profile 108, as previously described. The flow then advances to step S403 where generated destination colorimetric color appearance profile 207 and generated destination colorimetric color device profile 206 are provided to CMS 114 and then to step S404 where CMS 114 performs a color management task using source colorimetric color device profile 106, source colorimetric appearance profile 107, generated destination colorimetric color device profile 206, and generated destination colorimetric color appearance profile 207, as previously described.

Figure 5:
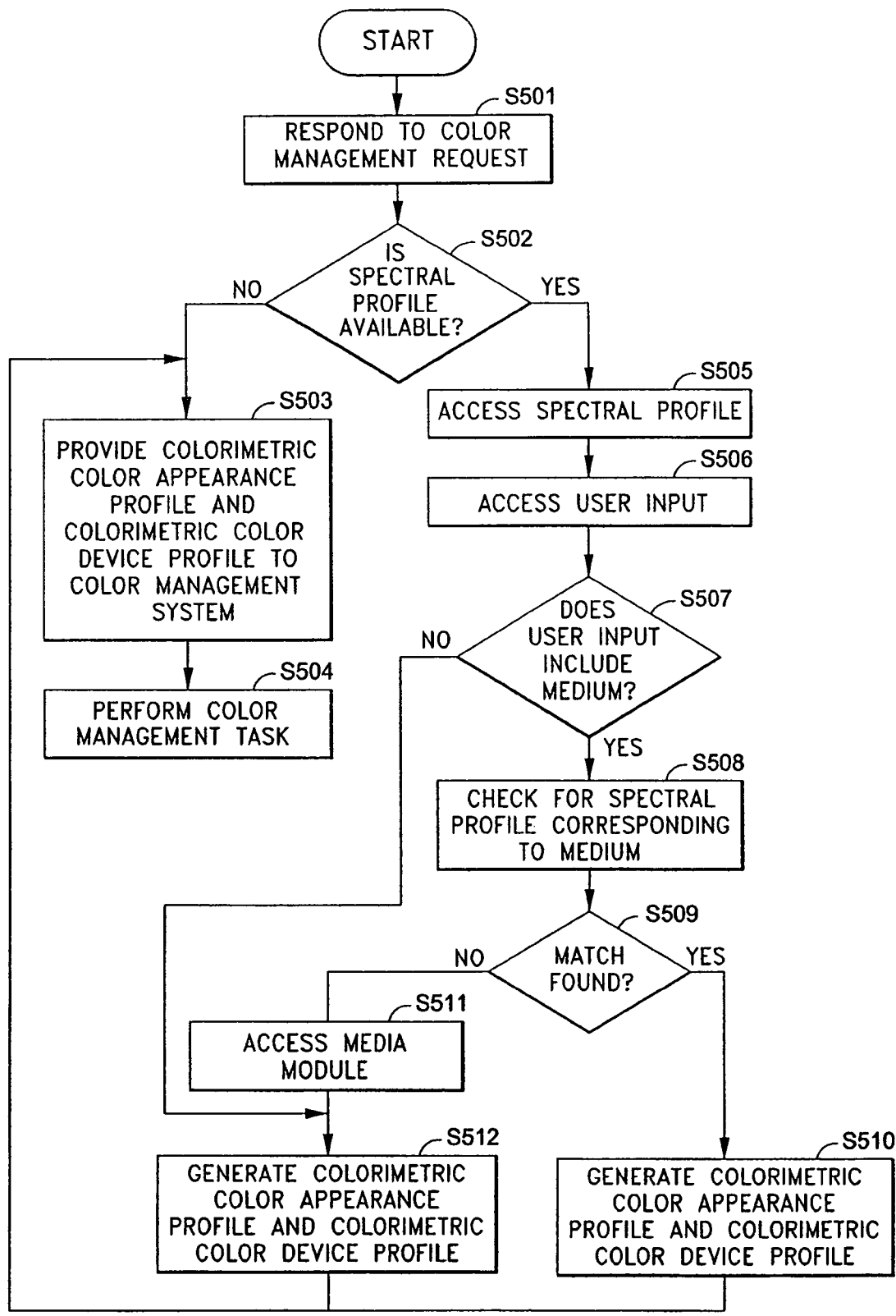
FIG. 5 is a flow diagram for explaining construction of colorimetric color profiles based on user input and spectral data according to another embodiment of the invention where if the user specifies a medium, a check is first performed to find a corresponding spectral profile.

FIG. 5 is a flow diagram showing operation of PGM 111 and CMS 114 according to another embodiment of the present invention where if user input 109 specifies a medium, PGM 111 checks for spectral profile 108 corresponding to the specified medium. Steps S501 to S507 respectively correspond to steps S301 to S307 described in FIG. 3 above. In step S507, PGM 111 determines whether user input 109 includes a medium. If user input 109 includes a medium, the flow branches to step S508 where PGM 111 checks for spectral profile 108 corresponding to the specified medium. Spectral profile 108 corresponds to the specified medium if the spectral reflectance data in spectral profile 108 was measured for the same medium specified by user input 109. PGM 111 performs this check by searching through a list of available spectral profiles to find a match for the specified medium. Multiple spectral profiles may be available. For example, a printer may have color device profiles for each type of paper to be printed on. In step S509, PGM 111 determines whether such a corresponding match is found. If a spectral profile 108 corresponding to the specified medium is found, the flow branches to step S510 where PGM 111 generates destination colorimetric color appearance profile 207 based on user input 109, and generates destination colorimetric color device profile 206 based on user input 109 and corresponding spectral profile 108. In this way, PGM 111 does not access media module 112 to obtain spectral reflectance data for the specified medium if there is an existing spectral profile 108 corresponding to the user specified medium. The flow then advances to step S503 where PGM 111 provides destination colorimetric color appearance profile 207 and destination colorimetric color device profile 206 to CMS 114 and then to step S504 where CMS 114 performs a color management task using source colorimetric color device profile 106, source colorimetric appearance profile 107, generated destination colorimetric color device profile 206, and generated destination colorimetric color appearance profile 207, as previously described.

If PGM 111 determines that no match is found in step S509, the flow branches to step S511 where PGM 111 accesses media module 112 to obtain spectral reflectance data for the specified medium. In step S512, PGM 111 generates destination colorimetric color appearance profile 207 based on user input 109 and destination colorimetric color device profile 206 based on user input 109, spectral profile 108, and the spectral reflectance data from media module 112, as previously described. The flow then advances to step S503 where PGM 111 provides generated destination colorimetric color appearance profile 207 and generated destination colorimetric color device profile 206 to CMS 114. In step S504 CMS 114 performs a color management task using source colorimetric color device profile 106, source colorimetric appearance profile 107, generated destination colorimetric color device profile 206, and generated destination colorimetric color appearance profile 207, as previously described.

If in step S507 PGM 111 determines that user input 109 does not include a medium, the flow branches to step S512 where PGM 111 generates destination colorimetric color appearance profile 207 based on user input 109 and destination colorimetric color device profile 206 based on user input 109 and spectral profile 108, as previously described. The flow then advances to step S503 where PGM 111 provides generated destination colorimetric color appearance profile 207 and generated destination colorimetric color device profile 206 to CMS 114. In step S504 CMS 114 performs a color management task using source colorimetric color device profile 106, source colorimetric appearance profile 107, generated destination colorimetric color device profile 206, and generated destination colorimetric color appearance profile 207, as previously described.

The invention has been described with particular illustrative embodiments. In particular, the invention has been described in relation to generation of destination colorimetric color appearance profiles and destination colorimetric color device profiles. It is to be understood that the invention is not limited to the above-described embodiments and that various changes and modifications may be made by those of ordinary skill in the art without departing from the spirit and scope of the invention.

What is claimed is:

1. A method for generating a colorimetric color appearance profile and a colorimetric color device profile from spectral data and user input, comprising the steps of:
   accessing a spectral profile containing spectral data together with normalized colorimetric values;
   accessing a user input provided by a user on a viewing condition, light source and a medium;
   determining whether the user input corresponds to a pre-designated standard input;
   if the user input corresponds to the predesignated standard input,
      populating the colorimetric color appearance profile based on the normalized colorimetric values, and
      populating the colorimetric color device profile based on the normalized colorimetric values; and
   if the user input does not correspond to the predesignated standard input,
      accessing a media module to obtain a spectral reflectance on another medium,
      predicting a spectral reflectance of color patches on the medium based on the obtained spectral reflectance on the other medium, and based on an interaction between the medium and material of the color patches,
      generating the colorimetric color appearance profile based on the user input, and
      generating the colorimetric color device profile based on the user input, the predicted spectral reflectance, and the spectral data.

2. A method according to claim 1, wherein the generating the colorimetric color appearance profile step further comprises:
   constructing colorimetric values for the colorimetric color appearance profile based on the user input; and
   providing said colorimetric values to the colorimetric color appearance profile.

3. A method according to claim 1, wherein the generating the colorimetric color device profile step further comprises:
  constructing colorimetric values for the colorimetric color device profile based on the user input and the spectral data; and
  providing said colorimetric values to the colorimetric color device profile.

4. A method according to claim 1, wherein the method is performed by a driver or application profile generation module.

5. A method according to claim 1, wherein said spectral profile further includes a colorimetric value of a white point and normalized colorimetric values for the specified white point that characterize the device.

6. A method according to claim 1, wherein the user input is entered through a user interface, and the colorimetric color appearance profile and the colorimetric color device profile are generated on-the-fly.

7. A method according to claim 6, wherein said user interface allows direct measurement of the user input using a measuring device.

8. A method according to claim 1, wherein the user input may be selected from a list of predesignated standard inputs.

9. A method according to claim 1, wherein the user input may further be a light source spectral power distribution, an illumination level, an intensity of the light source, a surround characteristic, and an observer adaptation level.

10. A method according to claim 1, further comprising the steps of:
  accessing a list of available spectral profiles and finding a spectral profile corresponding to a specified medium if the user input specifies a medium; and
  accessing the media module to predict spectral reflectances if no spectral profile is found corresponding to the specified medium.

11. A method according to claim 1, further comprising the steps of:
  generating the colorimetric color appearance profile if the user input specifies viewing conditions different from predesignated standard viewing conditions;
  generating the colorimetric color device profile if the user input specifies a medium and/or light source different from a predesignated standard medium and/or light source; and
  generating the colorimetric color appearance profile and the colorimetric color device profile if no predesignated standard color appearance profile and no predesignated standard color device profile are available.

12. A method according to claim 1, further comprising the step of:
  providing the generated colorimetric color appearance profile and the generated colorimetric color device profile to a color management system,
  wherein the color management system accesses a source image, a source colorimetric color appearance profile and a source colorimetric color device profile,
  and uses the source colorimetric color appearance profile, the source colorimetric color device profile, the generated colorimetric color appearance profile, and the generated colorimetric color device profile to convert colors in the source image to corresponding colors in a destination image in order to maintain color reproduction requirements for the source image.

13. A method according to claim 12, wherein the color management system is implemented by an operating system, an application or a standalone module.

14. A profile generation module stored on a non-transitory computer-readable storage medium for generating a colorimetric color appearance profile and a colorimetric color device profile from spectral data and user input, comprising:
  an accessing unit configured to access a spectral profile containing spectral data together with normalized colorimetric values, and
  to access a user input provided by a user on a viewing condition, light source and a medium;
  a determining unit configured to determine whether the user input corresponds to a predesignated standard input;
  if the user input corresponds to the predesignated standard input,
    the colorimetric color appearance profile is populated by a populating unit comprised in the profile generation module based on the normalized colorimetric values, and
    the colorimetric color device profile is populated by the populating unit based on the normalized colorimetric values; and
  if the user input does not correspond to the predesignated standard input,
    the accessing unit accesses a media module to obtain a spectral reflectance on another medium, wherein the media module comprises a prediction unit configured to predict a spectral reflectance of color patches on the medium based on the obtained spectral reflectance on the other medium, and based on an interaction between the medium and material of the color patches,
    the colorimetric color appearance profile is generated by a first generation unit comprised in the profile generation module based on the user input, and
    the colorimetric color device profile is generated by a second generation unit comprised in the profile generation module based on the user input, the predicted spectral reflectance, and the spectral data.

15. A profile generation module according to claim 14, wherein the first generation unit is configured:
  to construct colorimetric values for the colorimetric color appearance profile based on the user input; and
  to provide said colorimetric values to the colorimetric color appearance profile.

16. A profile generation module according to claim 14, wherein the second generation unit is configured:
  to construct colorimetric values for the colorimetric color device profile based on the user input and the spectral data; and
  to provide said colorimetric values to the colorimetric color device profile.

17. A profile generation module according to claim 14, wherein said profile generation module is a driver or application profile generation module.

18. A profile generation module according to claim 14, wherein said spectral profile further includes a colorimetric value of a white point and normalized colorimetric values for the specified white point that characterize the device.

19. A profile generation module according to claim 14, wherein the user input is entered through a user interface, and the colorimetric color appearance profile and the colorimetric color device profile are generated on-the-fly.

20. A profile generation module according to claim 19, wherein said user interface allows direct measurement of the user input using a measuring device.

21. A profile generation module according to claim 14, wherein the user input may be selected from a list of predesignated standard inputs.

22. A profile generation module according to claim 14, wherein the user input may further be a light source spectral power distribution, an illumination level, an intensity of the light source, a surround characteristic, and an observer adaptation level.

23. A profile generation module according to claim 14, further comprising:
    a second accessing unit configured to access a list of available spectral profiles and to find a spectral profile corresponding to a specified medium if the user input specifies a medium, and
    to access the media module to predict spectral reflectances if no spectral profile is found corresponding to the specified medium.

24. A profile generation module according to claim 14, wherein said first and second generation units are configured:
    to generate the colorimetric color appearance profile if the user input specifies viewing conditions different from predesignated standard viewing conditions;
    to generate the colorimetric color device profile if the user input specifies a medium and/or light source different from a predesignated standard medium and/or light source; and
    to generate the colorimetric color appearance profile and the colorimetric color device profile if no predesignated standard color appearance profile and no predesignated standard color device profile are available.

25. A profile generation module according to claim 14, wherein said first and second generation units are configured to provide the generated colorimetric color appearance profile and the generated colorimetric color device profile to a color management system,
    wherein the color management system accesses a source image, a source colorimetric color appearance profile and a source colorimetric color device profile,
    and uses the source colorimetric color appearance profile, the source colorimetric color device profile, the generated colorimetric color appearance profile, and the generated colorimetric color device profile to convert colors in the source image to corresponding colors in a destination image in order to maintain color appearance.

26. A profile generation module according to claim 25, wherein the color management system is implemented by an operating system, an application or a standalone module.

27. A non-transitory computer readable medium which stores a computer-executable program, wherein the program is executed by a computer so as to control the computer to perform a method for generating a colorimetric color appearance profile and a colorimetric color device profile from spectral data and user input, wherein the method comprises the steps of:
    accessing a spectral profile containing spectral data together with normalized colorimetric values;
    accessing a user input provided by a user on a viewing condition, light source and a medium;
    determining whether the user input corresponds to a predesignated standard input;
    if the user input corresponds to the predesignated standard input,
        populating the colorimetric color appearance profile based on the normalized colorimetric values, and
        populating the colorimetric color device profile based on the normalized colorimetric values; and
    if the user input does not correspond to the predesignated standard input,
        accessing a media module to obtain a spectral reflectance on another medium,
        predicting a spectral reflectance of color patches on the medium based on the obtained spectral reflectance on the other medium, and based on an interaction between the medium and material of the color patches,
        generating the colorimetric color appearance profile based on the user input, and
        generating the colorimetric color device profile based on the user input, the predicted spectral reflectance, and the spectral data.

28. A computer readable medium which stores a computer-executable program according to claim 27, wherein the generating the colorimetric color appearance profile step further comprises:
    constructing colorimetric values for the colorimetric color appearance profile based on the user input; and
    providing said colorimetric values to the colorimetric color appearance profile.

29. A computer readable medium which stores a computer-executable program according to claim 27, wherein the generating the colorimetric color device profile step further comprises:
    constructing colorimetric values for the colorimetric color device profile based on the user input and the spectral data; and
    providing said colorimetric values to the colorimetric color device profile.

30. A computer readable medium which stores a computer-executable program according to claim 27, wherein the method is performed by a driver or application profile generation module.

31. A computer readable medium which stores a computer-executable program according to claim 27, wherein said spectral profile further includes a colorimetric value of a white point and normalized colorimetric values for the specified white point that characterize the device.

32. A computer readable medium which stores a computer-executable program according to claim 27, wherein the user input is entered through a user interface, and the colorimetric appearance profile and the colorimetric device profile are generated on-the-fly.

33. A computer readable medium which stores a computer-executable program according to claim 32, wherein said user interface allows direct measurement of the user input using a measuring device.

34. A computer readable medium which stores a computer-executable program according to claim 27, wherein the user input may be selected from a list of predesignated standard inputs.

35. A computer readable medium which stores a computer-executable program according to claim 27, wherein the user input may further be a light source spectral power distribution, an illumination level, an intensity of the light source, a surround characteristic, and an observer adaptation level.

36. A computer readable medium which stores a computer-executable program according to claim 27, the method further comprising the steps of:
    accessing a list of available spectral profiles and finding the spectral profile corresponding to a specified medium if the user input specifies a medium; and
    accessing the media module to predict spectral reflectances if no spectral profile is found corresponding to the specified medium.

37. A computer readable medium which stores a computer-executable program according to claim 27, the method further comprising the steps of:
- generating the colorimetric color appearance profile if the user input specifies viewing conditions different from predesignated standard viewing conditions;
- generating the colorimetric color device profile if the user input specifies a medium and/or light source different from a predesignated standard medium and/or light source; and
- generating the colorimetric color appearance profile and the colorimetric color device profile if no predesignated standard color appearance profile and no predesignated standard color device profile are available.

38. A computer readable medium which stores a computer-executable program according to claim 27, the method further comprising the step of:
- providing the generated colorimetric color appearance profile and the generated colorimetric color device profile to a color management system,
- wherein the color management system accesses a source image, a source colorimetric color appearance profile and a source colorimetric color device profile,
- and uses the source colorimetric color appearance profile, the source colorimetric color device profile, the generated colorimetric color appearance profile, and the generated colorimetric color device profile to convert colors in the source image to corresponding colors in a destination image in order to maintain color reproduction requirements for the source image.

39. A computer readable medium which stores a computer-executable program according to claim 38, wherein the color management system is implemented by an operating system, an application or a standalone module.

40. A programmed computing apparatus comprising:
- a memory for storing a source image, a source colorimetric color appearance profile, a source colorimetric color device profile, a spectral profile, user input and a computer executable program; and
- a processor for executing the computer executable program stored in said memory;
- wherein the computer executable program comprises
  - accessing a spectral profile containing spectral data together with normalized colorimetric values,
  - accessing a user input provided by a user on a viewing condition, light source and a medium,
  - determining whether the user input corresponds to a pre-designated standard input,
  - if the user input corresponds to the predesignated standard input,
    - populating the colorimetric color appearance profile based on the normalized colorimetric values, and
    - populating the colorimetric color device profile based on the normalized colorimetric values, and
  - if the user input does not correspond to the predesignated standard input,
    - accessing a media module to obtain a spectral reflectance on another medium,
    - predicting a spectral reflectance of color patches on the medium based on the obtained spectral reflectance on the other medium, and based on an interaction between the medium and material of the color patches,
    - generating the colorimetric color appearance profile based on the user input, and
    - generating the colorimetric color device profile based on the user input, the predicted spectral reflectance, and the spectral data.

41. A programmed computing apparatus according to claim 40, wherein the generating the colorimetric color appearance profile step further comprises:
- constructing colorimetric values for the colorimetric color appearance profile based on the user input; and
- providing said colorimetric values to the colorimetric color appearance profile.

42. A programmed computing apparatus according to claim 40, wherein the generating the colorimetric color device profile step further comprises:
- constructing colorimetric values for the colorimetric color device profile based on the user input and the spectral data; and
- providing said colorimetric values to the colorimetric color device profile.

43. A programmed computing apparatus according to claim 40, wherein the computer executable program is performed by a driver or application profile generation module.

44. A programmed computing apparatus according to claim 40, wherein said spectral profile further includes a colorimetric value of a white point and normalized colorimetric values for the specified white point that characterize the device.

45. A programmed computing apparatus according to claim 40, wherein the user input is entered through a user interface, and the colorimetric color appearance profile and the colorimetric color device profile are generated on-the-fly.

46. A programmed computing apparatus according to claim 45, wherein said user interface allows direct measurement of the user input using a measuring device.

47. A programmed computing apparatus according to claim 40, wherein the user input may be selected from a list of predesignated standard inputs.

48. A programmed computing apparatus according to claim 40, wherein the user input may further be a light source spectral power distribution, an illumination level, an intensity of the light source, a surround characteristic, and an observer adaptation level.

49. A programmed computing apparatus according to claim 40, wherein the computer executable program further comprises the steps of:
- accessing a list of available spectral profiles and finding a spectral profile corresponding to a specified medium if the user input specifies a medium; and
- accessing the media module to predict spectral reflectances if no spectral profile is found corresponding to the specified medium.

50. A programmed computing apparatus according to claim 40, wherein the computer executable program further comprises the steps of:
- generating the colorimetric color appearance profile if the user input specifies viewing conditions different from predesignated standard viewing conditions;
- generating the colorimetric color device profile if the user input specifies a medium and/or light source different from a predesignated standard medium and/or light source; and
- generating the colorimetric color appearance profile and the colorimetric color device profile if no predesignated standard color appearance profile and no predesignated standard color device profile are available.

51. A programmed computing apparatus according to claim 40, wherein the computer executable program further comprises the step of:

providing the generated colorimetric color appearance profile and the generated colorimetric color device profile to a color management system, wherein the color management system accesses a source image, a source colorimetric color appearance profile and a source colorimetric color device profile, and uses the source colorimetric color appearance profile, the source colorimetric color device profile, the generated colorimetric color appearance profile, and the generated colorimetric color device profile to convert colors in the source image to corresponding colors in a destination image in order to maintain color appearance.

52. A programmed computing apparatus according to claim 51, wherein the color management system is implemented by an operating system.

* * * * *